(12) United States Patent
Franckhauser et al.

(10) Patent No.: US 11,286,102 B2
(45) Date of Patent: Mar. 29, 2022

(54) AEROSOL DISPENSER HAVING A CAP TO PREVENT VALVE REMOVAL

(71) Applicant: The Procter & Gamble Company, Cincinnati, OH (US)

(72) Inventors: Andrew William Franckhauser, Batavia, OH (US); Scott Edward Smith, Cincinnati, OH (US); Kerry Lloyd Weaver, Florence, KY (US); Robert Earl Magness, Mason, OH (US); Nathan Daniel Grubbs, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 16/125,815

(22) Filed: Sep. 10, 2018

(65) Prior Publication Data

US 2019/0077582 A1    Mar. 14, 2019

Related U.S. Application Data

(63) Continuation-in-part of application No. 15/702,783, filed on Sep. 13, 2017, now Pat. No. 11,161,661.

(30) Foreign Application Priority Data

Oct. 30, 2017    (EP) .................................... 17199221

(51) Int. Cl.
*B65D 83/40*    (2006.01)
*B65D 83/44*    (2006.01)
(Continued)

(52) U.S. Cl.
CPC .............. *B65D 83/40* (2013.01); *B29B 11/14* (2013.01); *B65D 83/38* (2013.01); *B65D 83/44* (2013.01)

(58) Field of Classification Search
CPC . B29B 2911/14413; B29B 2911/14453; B29B 11/14; B29K 2023/12;
(Continued)

(56) References Cited

U.S. PATENT DOCUMENTS 2,863,699 A    12/1958 Elser
3,333,743 A    8/1967 Meyers
(Continued)

FOREIGN PATENT DOCUMENTS

CA           966433 A    4/1975
DE    102013107061 A1    1/2015
(Continued)

OTHER PUBLICATIONS

International Search Report and Written Opinion dated Nov. 29, 2018, U.S. Appl. No. 15/702,783, 16 pgs.
(Continued)

*Primary Examiner* — Vishal Pancholi
*Assistant Examiner* — Robert K Nichols, II
(74) *Attorney, Agent, or Firm* — Steven Robert Chuey

(57) ABSTRACT

An outer container for an aerosol dispenser. The outer container has a closed end bottom and a longitudinally opposed open, open neck. A complementary valve can be received in the neck. A cap overlays the valve and engages the outer container, valve, or both, to prevent removal of the valve. The cap may have threads, ratchets/pawls, splines, spikes, bayonet fitting or combination thereof to engage the valve or outer container.

5 Claims, 6 Drawing Sheets

(51) Int. Cl.
*B29B 11/14* (2006.01)
*B65D 83/38* (2006.01)

(58) Field of Classification Search
CPC ...... B29K 2067/003; B29L 2031/7142; B65D 83/44; B65D 83/28; B65D 83/38; B65D 55/022; B65D 50/00; B65D 83/62; B65D 41/0471; B65D 2255/20; B05B 11/008; B05B 11/0013
USPC ...... 222/153.09, 399, 402.1, 402.21–402.25, 222/394, 386.5; 215/330
See application file for complete search history.

(56) References Cited

U.S. PATENT DOCUMENTS

| | | | |
|---|---|---|---|
| 3,343,730 A | 9/1967 | Arthur |
| 3,403,804 A | 10/1968 | Colombo |
| 3,450,254 A | 6/1969 | Miles |
| 3,717,287 A | 2/1973 | Marand |
| 3,977,557 A | 8/1976 | Hazard |
| 4,030,644 A | 6/1977 | Creighton |
| 4,114,779 A | 9/1978 | Stoll, Iii |
| RE30,093 E | 9/1979 | Burger |
| 4,281,778 A | 8/1981 | Stull |
| 4,323,203 A | 4/1982 | Neufeld |
| 4,330,066 A | 5/1982 | Berliner |
| 4,345,691 A | 8/1982 | Burke |
| 4,366,921 A | 1/1983 | Kirk, Jr. |
| 4,785,963 A | 11/1988 | Magley |
| 4,934,547 A | 6/1990 | Mayes |
| 4,969,577 A | 11/1990 | Werding |
| 4,984,717 A | 1/1991 | Burton |
| 5,184,747 A | 2/1993 | Nolte |
| 5,219,005 A | 6/1993 | Stoffel |
| 5,489,041 A | 2/1996 | Matthews et al. |
| 5,507,420 A | 4/1996 | Oneill |
| 5,839,623 A | 11/1998 | Losenno |
| 6,019,252 A | 2/2000 | Benecke et al. |
| 6,254,820 B1 | 7/2001 | Cornell |
| 6,375,045 B1 | 2/2002 | Ki |
| 6,394,364 B1 | 5/2002 | Abplanalp |
| 7,028,866 B2 | 4/2006 | Kunesh et al. |
| 7,279,207 B2 | 10/2007 | Darr |
| 7,303,087 B2 | 12/2007 | Flashinski et al. |
| 8,074,847 B2 | 12/2011 | Smith |
| 8,096,327 B2 | 1/2012 | Hirz |
| 8,439,223 B2 | 5/2013 | Smith et al. |
| 8,505,762 B2 | 8/2013 | Holbach et al. |
| 8,511,522 B2 | 8/2013 | Chan et al. |
| 8,631,632 B2 | 1/2014 | Morales et al. |
| 8,752,731 B2 | 6/2014 | Nimmo et al. |
| 8,844,765 B2 | 9/2014 | Tryon |
| 8,869,842 B2 | 10/2014 | Smith |
| 8,944,292 B2 | 2/2015 | Moreau |
| 9,045,325 B2 | 6/2015 | Apps |
| 9,061,795 B2 | 6/2015 | Girardot et al. |
| 9,132,955 B2 | 9/2015 | Smith et al. |
| 9,174,229 B2 | 11/2015 | Smith |
| 9,296,550 B2 | 3/2016 | Smith et al. |
| 9,334,103 B2 | 5/2016 | Soliman |
| 9,394,098 B2 | 7/2016 | Kohls et al. |
| 9,505,509 B2 | 11/2016 | Smith |
| 2002/0027146 A1 | 3/2002 | De |
| 2009/0014679 A1 | 1/2009 | Hygema et al. |
| 2011/0248035 A1 | 10/2011 | Peirsman |
| 2012/0211458 A1 | 8/2012 | Patel |
| 2012/0291911 A1 | 11/2012 | Smith |
| 2014/0183222 A1 | 7/2014 | Morrison |
| 2015/0034682 A1 | 2/2015 | Seling |
| 2016/0368700 A1 | 12/2016 | Smith et al. |
| 2017/0129690 A1 | 5/2017 | Sugawara |
| 2018/0043604 A1 | 2/2018 | Zeik et al. |
| 2018/0044096 A1 | 2/2018 | Neumann |
| 2019/0077558 A1 | 3/2019 | Smith |
| 2019/0077582 A1 | 3/2019 | Franckhauser |
| 2019/0077583 A1 | 3/2019 | Weaver |
| 2019/0077584 A1 | 3/2019 | Magness |

FOREIGN PATENT DOCUMENTS

| | | |
|---|---|---|
| WO | WO 91/08099 A1 | 6/1991 |
| WO | WO2017052165 A1 | 3/2017 |
| WO | WO2018065780 A1 | 4/2018 |

OTHER PUBLICATIONS

International Search Report and Written Opinion dated Nov. 29, 2018, U.S. Appl. No. 16/125,813, 16 pgs.
International Search Report and Written Opinion dated Nov. 30, 2018, U.S. Appl. No. 16/125,811, 14 pgs.
International Search Report and Written Opinion dated Nov. 30, 2018, U.S. Appl. No. 16/125,815, 16 pgs.
All Office Actions, U.S. Appl. No. 15/702,783.
All Office Actions, U.S. Appl. No. 16/125,811.
All Office Actions, U.S. Appl. No. 16/125,813.
14945 Extended EP Search Report for 17199221.7 dated Aug. 13, 2018, 11 pages.

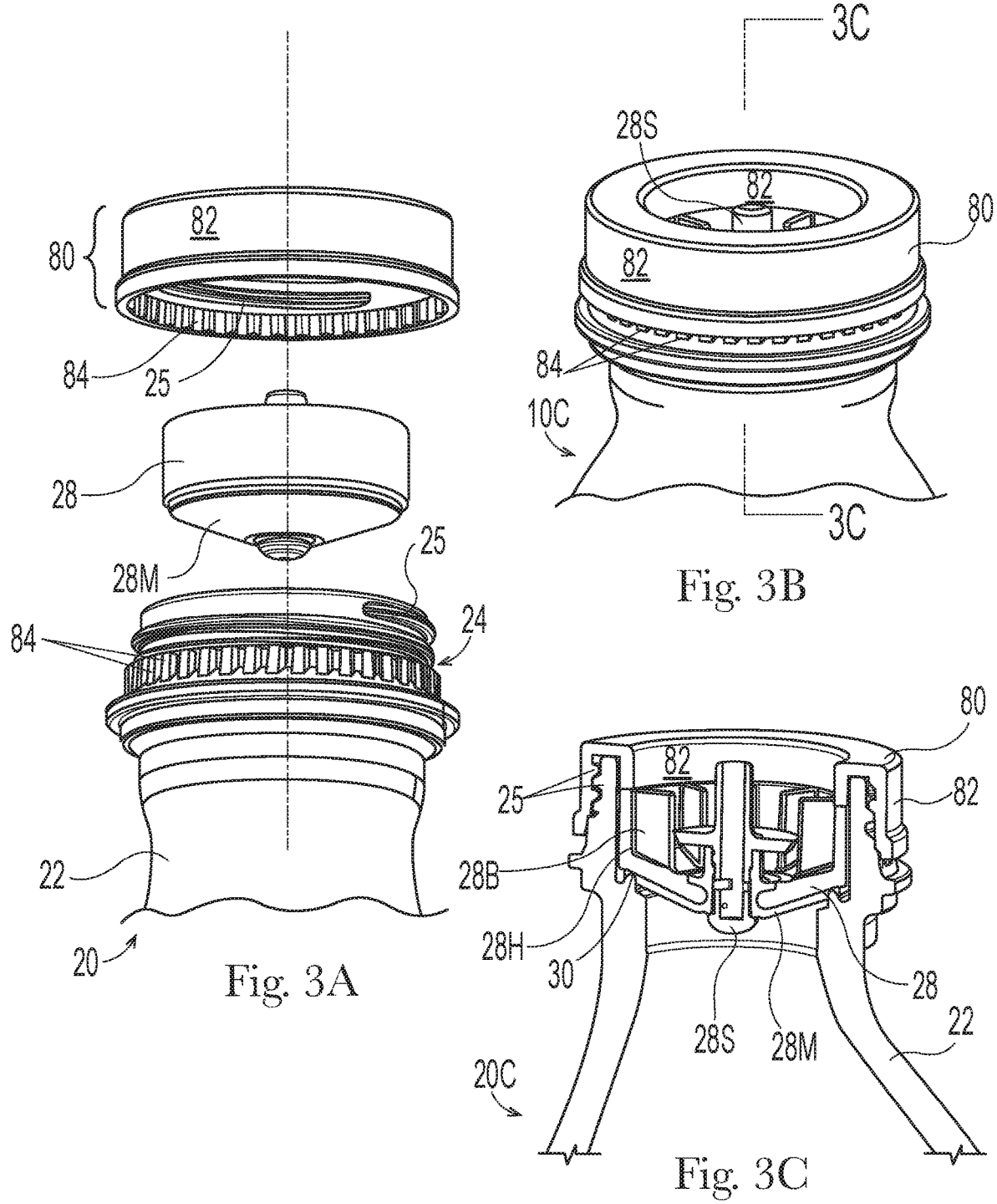

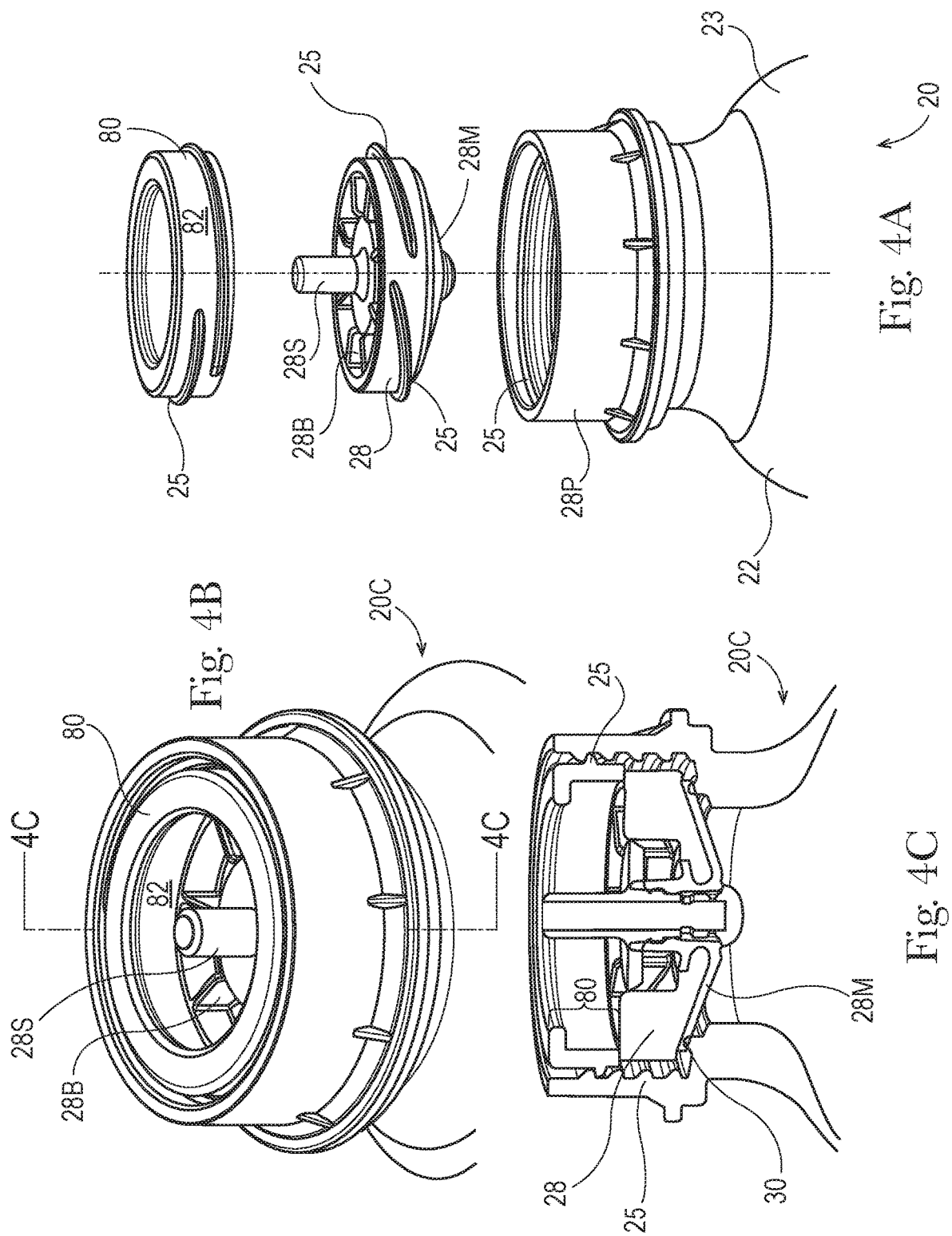

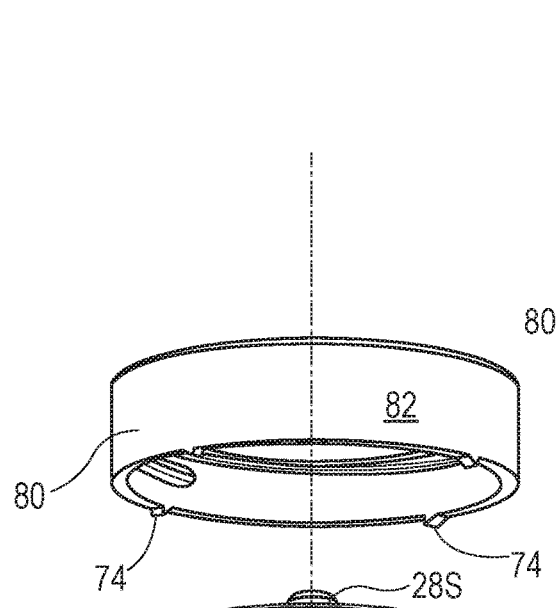
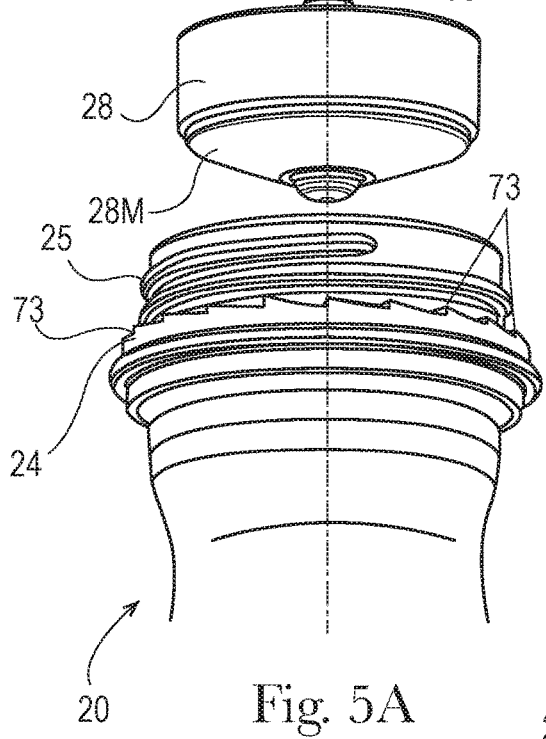
Fig. 5A
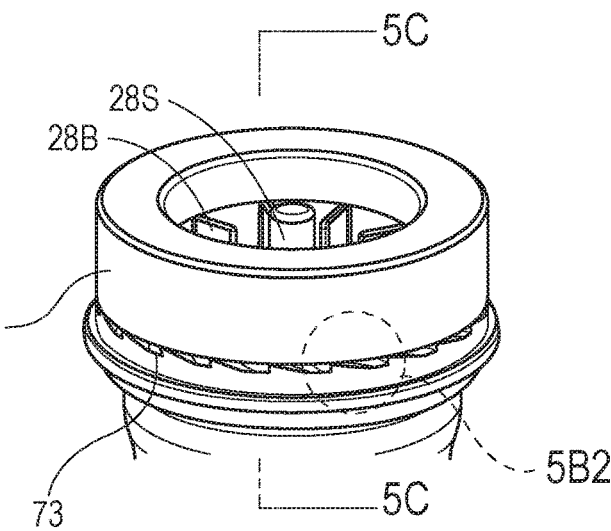
Fig. 5B1
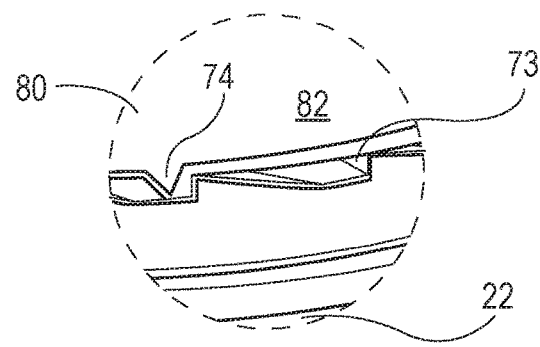
Fig. 5B2
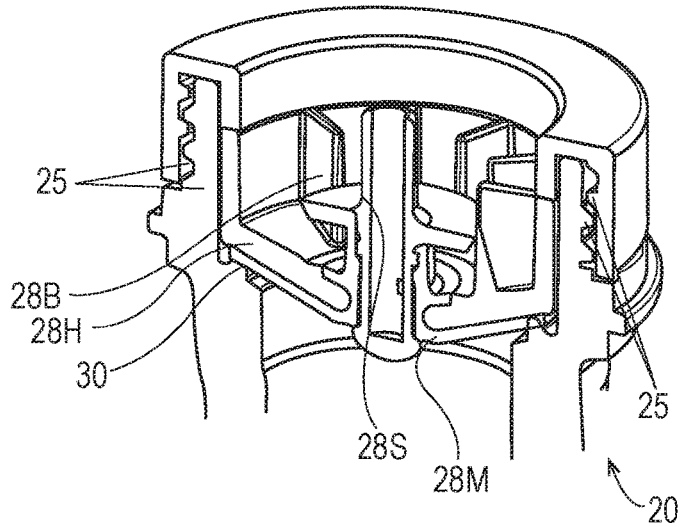
Fig. 5C

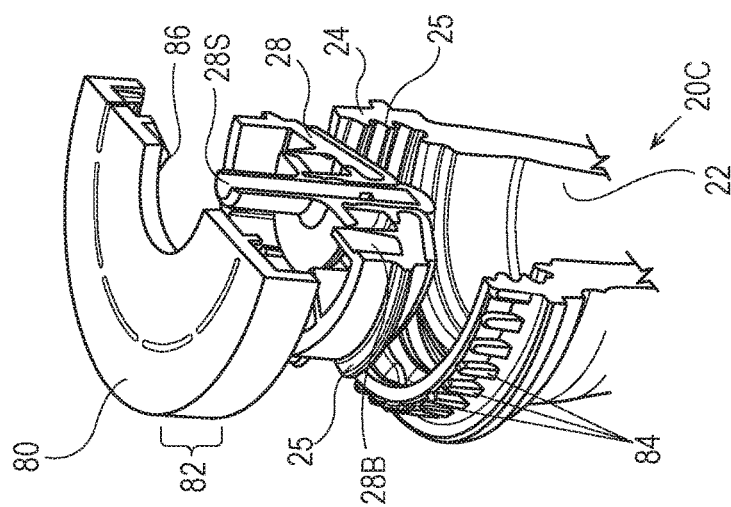
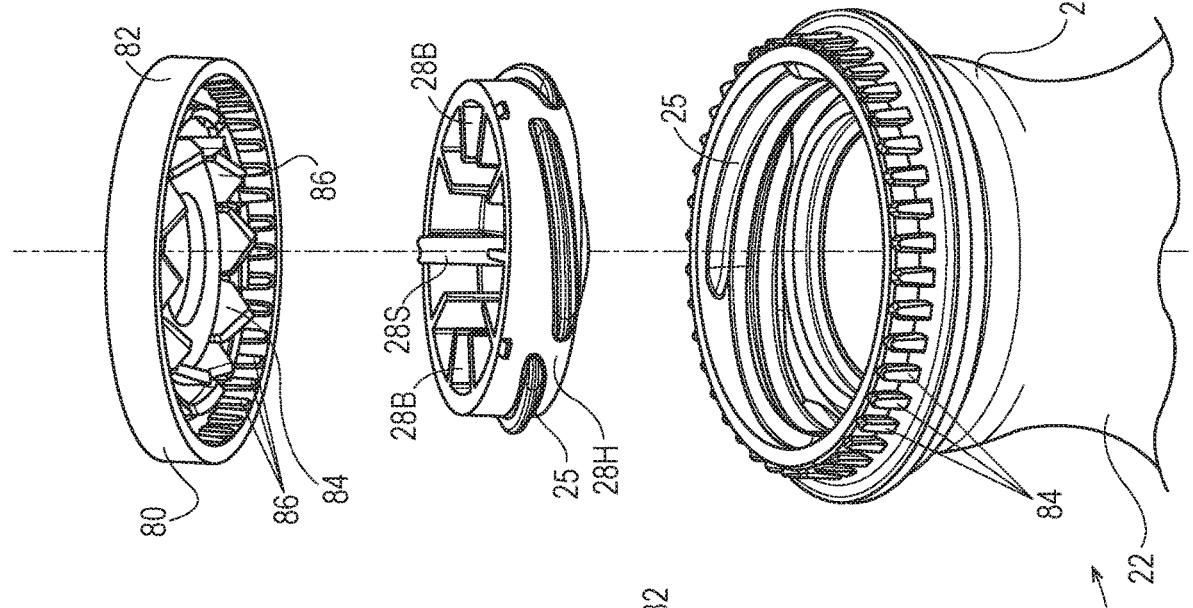
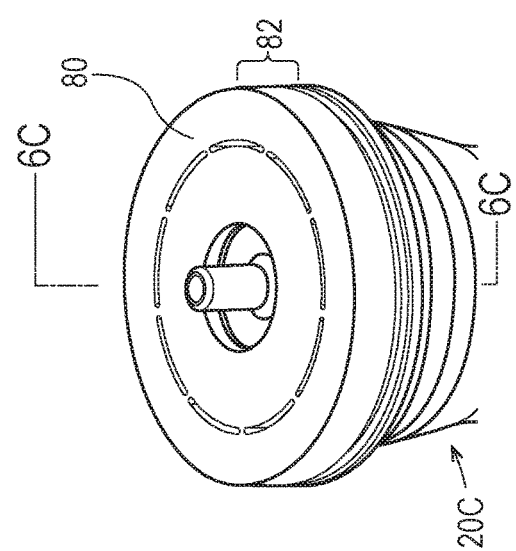

AEROSOL DISPENSER HAVING A CAP TO PREVENT VALVE REMOVAL

FIELD OF THE INVENTION

The present invention relates to aerosol dispensers having a cap to provide unintended valve removal.

BACKGROUND OF THE INVENTION

Aerosol dispensers are well known in the art. Aerosol dispensers typically comprise an outer container which acts as a frame for the remaining components and as a pressure vessel for propellant and product contained therein. Outer containers made of metal are well known in the art. However, metal containers can be undesirable due to high cost and limited recyclability. Attempts to use plastic have occurred in the art. Relevant attempts in the art to employ plastic in aerosol dispensers are found in U.S. Pat. Nos. 2,863,699; 3,333,743; 4,969,577; 8,752,731; 9,296,550; 9,334,103 and 2009/0014679.

The outer containers are typically, but not necessarily, cylindrical. The outer container may comprise a bottom for resting on horizontal surfaces such as shelves, countertops, tables etc. The bottom of the outer container may comprise a re-entrant portion as shown in U.S. Pat. No. 3,403,804 or a base cup as shown in commonly assigned U.S. Pat. Nos. 8,439,223 and 9,061,795. Sidewalls defining the shape of the outer container extend upwardly from the bottom to an open top.

The open top defines a neck for receiving additional components of the aerosol dispenser. The industry has generally settled upon a nominal neck diameter of 2.54 cm, for standardization of components among various manufacturers, although smaller diameters, such as 20 mm, are also used. Various neck shapes are shown in U.S. Pat. Nos. 6,019,252; 7,028,866; 7,279,207 and 7,303,087.

Typically a valve cup is inserted into the neck. The valve cup is sealed against the neck to prevent the escape of the propellant and loss of pressurization, such as described in U.S. Pat. Nos. 8,074,847; 8,096,327; 8,844,765; 8,869,842 and 9,505,509. The valve cup holds the valve components which are movable in relationship to the balance of the aerosol dispenser. Suitable valves are shown in commonly assigned U.S. Pat. Nos. 8,511,522 and 9,132,955. When the valves are opened, product may be dispensed through a nozzle, etc. as described in commonly assigned U.S. Pat. No. 9,174,229.

A valve may be inserted into the valve cup for selective actuation by the user. The valve is typically normally closed, and may be opened to create a flow path for the product to ambient or a target surface. The valve may be compatible with local recycling standards. Suitable valves are disclosed in commonly assigned U.S. Pat. Nos. 8,511,522 and 9,132, 955.

If a valve is to be assembled into an aerosol, typically the valve cup is crimped onto the neck of the aerosol container. But this operation is expensive and is difficult to perform with a plastic valve cup. A separate interlock may be used to attach a valve to a valve cup, particularly a plastic valve 28 and plastic valve cup are used. Suitable interlocks include bayonet fittings and threads as disclosed in commonly assigned P&G Case 14458, Ser. No. 15/235,237, filed Aug. 12, 2016. A pressure vessel with a threaded bore is proposed in U.S. Pat. No. 8,505,762.

A bag may be used to contain product for selective dispensing by a user. Dispensing of product from the bag occurs in response to the user actuating the valve. The bag separates product within the bag from propellant disposed between the bag and container. This bag limits or even prevents intermixing of the contents of the bag and the components outside of the bag. Thus, product may be contained in the bag. Propellant may be disposed between the outside of the bag and the inside of the outer container. Upon actuation of the valve, a flow path out of the bag is created. This embodiment is commonly called a bag in can and may be used, for example, in dispensing shaving cream gels. Alternatively, a bag may be directly joined to the valve housing, in a configuration commonly called a bag on valve. A suitable bag configuration is disclosed in commonly assigned P&G Case 14458, Ser. No. 15/235,227, filed Aug. 12, 2016 which teaches attaching a bag to a valve cup.

If a bag configuration is desired, propellant may be disposed between the bag and outer container, as disclosed in U.S. Pat. No. 5,219,005 and in commonly assigned U.S. Pat. Nos. 8,631,632 and 8,869,842. Afterwards, product fill may occur in a separate, remote, operation, optionally carried out in another location, which may be in the same country or in a different country as disclosed in commonly assigned 2012/0291911. Such a manufacturing process can conserve costs in production, shipment and/or storage.

An aerosol container having a bag therein may be made from a dual layer preform, having plural layers disposed one inside the other. Relevant attempts include U.S. Pat. Nos. 3,450,254; 4,330,066; 6,254,820; RE 30093 E; WO 9108099 and US 2011/0248035 A1. But each of these attempts requires a separate operation to attach the bag to the relevant component. Each attachment step takes time in manufacturing and creates the opportunity for leakage if not correctly performed. Improvements in dual layer preforms are found in commonly assigned P&G Case 14461, application Ser. No. 15/235,279, filed Aug. 12, 2016.

Alternatively, a dip tube may be used if intermixing of the product and propellant is desired. When the user actuates the valve, the product and propellant are dispensed together through the dip tube. This embodiment may utilize a dip tube. The dip tube takes the product and propellant mixture from the bottom of the outer container. Or a piston may be used to expel product, particularly if highly viscous, as described in 2002/0027146, U.S. Pat. No. 6,375,045 and commonly assigned 2016/0368700.

Collectively, bags, dip tube, pistons and the associated hardware are referred to as product delivery devices. Various formats for the delivery devices may be required for different products, often complicating production. For example, one product may require a dip tube product delivery device in conjunction with a very small nozzle. The next aerosol dispenser on the production schedule may simply require changeout to a new, larger, nozzle.

But if the one wishes to manufacture multiple products, multiply different aerosol dispensers may be necessary. Different aerosol dispensers may require different valves. The valves may be attached to the outer containers by a fitting as disclosed in commonly assigned U.S. application Ser. No. 15/235,237, filed Aug. 12, 2016 under Case No. 14459. This arrangement allows different combinations of valves and outer containers to be mixed and matched as desired.

If the valve is threadedly attached to the outer container and the outer container is pressurized, it is important that the valve does not become dislodged allowing rapid and possibly catastrophic depressurization to occur. If the valve is not fully engaged, propellant pressure may expel the valve, creating a missile hazard or other safety concerns. Or a user may attempt disassembly and become injured.

Thus it is important the valve does not become unthreaded and lead to a missile hazard or catastrophic failure. One attempt to prevent reverse rotation is shown in U.S. Pat. No. 4,323,203. But this attempt relies upon a selection switch to selectively provide for reverse rotation and is infeasible for the present invention. Tamper evident bands have been used in the beverage industry. But these attempts also allow for reverse rotation, and are likewise unsuitable for the present invention.

Accordingly, this invention is directed to the problem of how to prevent a valve from unintended removal from an aerosol dispenser and particularly how to prevent a threaded valve from becoming detached from an aerosol container by unthreading.

SUMMARY OF THE INVENTION

The invention comprises an aerosol container for use with an aerosol dispenser and defining a longitudinal axis. The aerosol container comprises an outer container having an open neck. A valve is complementarily disposed in the neck. A cap overlies the valve and intercepts the valve and/or the outer container. The cap has threads, spikes, splines, ratchets/pawls and or bayonet fitting which engage and prevent undesired removal of the valve from the neck of the outer container.

BRIEF DESCRIPTION OF THE DRAWINGS

The drawings are to scale, unless otherwise noted as schematic. The onward direction is clockwise in the drawings unless otherwise stated.

FIG. 3A is a fragmentary exploded perspective view of an aerosol dispenser having an internally threaded cap.

FIG. 3B is a fragmentary view of an aerosol container according to the aerosol dispenser FIG. 3A in an assembled configuration.

FIG. 3C is a vertical fragmentary sectional view of the aerosol container of FIG. 3B taken along lines 3C-3C of FIG. 3B.

FIG. 4A is a fragmentary exploded perspective view of an aerosol dispenser having an externally threaded cap.

FIG. 4B is a fragmentary view of an aerosol container according to the aerosol dispenser FIG. 4A in an assembled configuration.

FIG. 4C is a vertical fragmentary sectional view of the aerosol container of FIG. 4B taken along lines 4C-4C of FIG. 4B.

FIG. 5A is a fragmentary exploded perspective view of an aerosol dispenser having an internally threaded cap having pawls.

FIG. 5B1 is a fragmentary view of an aerosol container according to the aerosol dispenser FIG. 5A in an assembled configuration.

FIG. 5B2 is an enlarged fragmentary view of the outer container and cap of FIG. 5B1.

FIG. 5C is a vertical fragmentary sectional view of the aerosol container of FIG. 5B taken along lines 5C-5C of FIG. 5B1.

FIG. 6A is a fragmentary exploded perspective view of an aerosol dispenser having a cap with splines and spikes.

FIG. 6B is a fragmentary view of an aerosol container according to the aerosol dispenser FIG. 6A in an assembled configuration.

FIG. 6C is a vertical fragmentary sectional view of the aerosol container of FIG. 6B taken along lines 6C-6C of FIG. 6B.

DETAILED DESCRIPTION OF THE INVENTION

Figure 1:
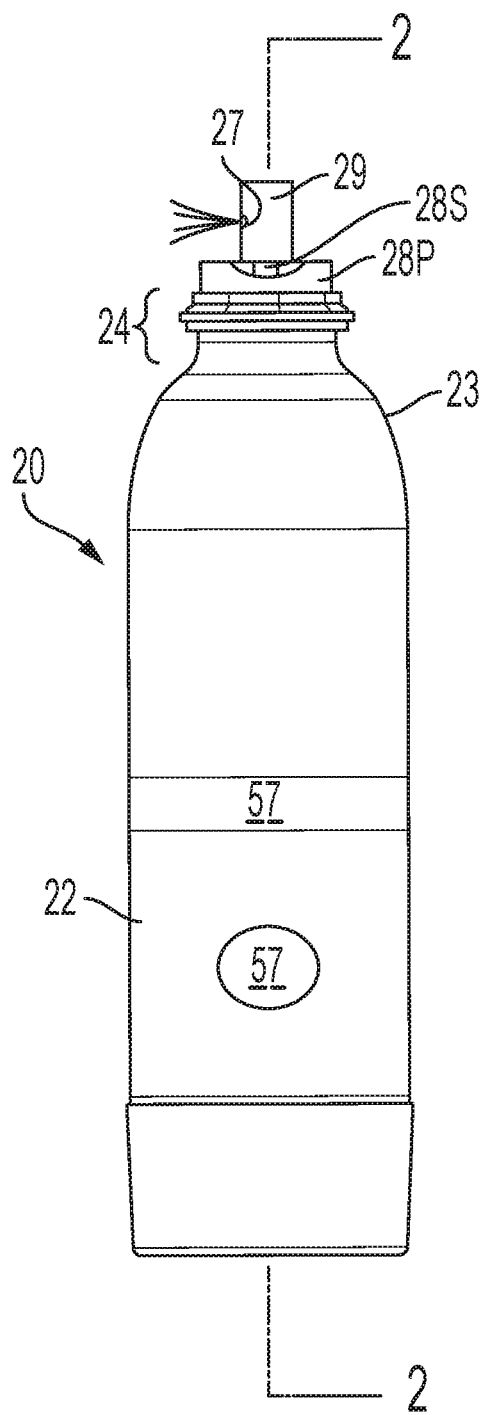
FIG. 1 is a side elevational view of an aerosol dispenser according to the present invention, shown partially in cutaway and schematically showing a spray being dispensed.
Figure 2:
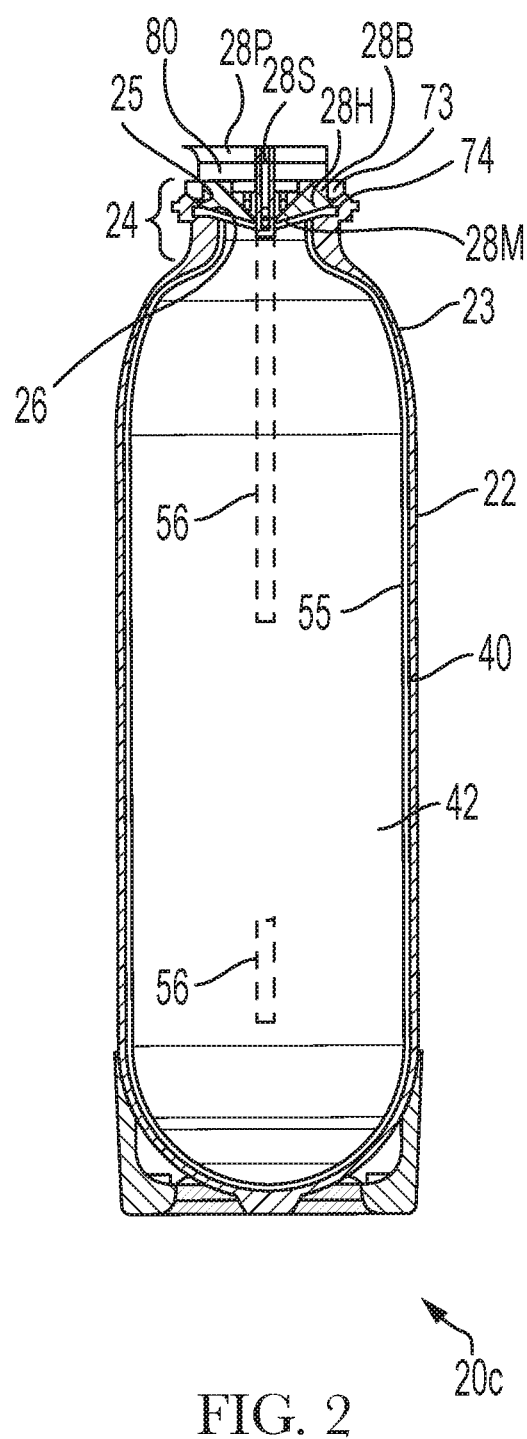
FIG. 2 is a vertical sectional view of an aerosol container, taken along lines 2-2 of FIG. 1, the actuator being removed for clarity.

Referring to FIGS. 1 and 2, an aerosol dispenser 20 and aerosol container 20C, each having a longitudinal axis, are shown, respectively. The aerosol dispenser 20 comprises a pressurizeable outer container 22 usable for such an aerosol dispenser 20. The outer container 22 has a neck 24 into which an optional valve cup may be sealingly disposed. A valve 28 and actuator 29 may be disposed in the valve cup for selective dispensing of product 42 from the aerosol dispenser 20. Or the valve 28 may be directly and threadedly attached to the neck 24 of the outer container.

A seal 30 having a surface for sealing a valve 28 to the valve cup or outer container 22 may be disposed below the valve cup and valve 28 to prevent escape of product 42 to ambient. As used herein, an aerosol container 20C may be a subset of an aerosol dispenser 20, and have an outer container 22, valve cup sealed thereto with a bag 55/dip tube 56, collectively referred to as a product delivery device 55, 56, joined to the valve cup, and optionally propellant 40, but not necessarily a valve 28, actuator 29, labeling, etc. Preferably the valve 28 may be directly joined to the outer container 22 without a separate and optional valve cup.

As used herein, the top of the aerosol dispenser 20 or the outer container 22 is taken as the uppermost part, when the aerosol dispenser 20 or container 22 is vertically oriented in its normal use or storage position. As used herein, the bottom of the aerosol dispenser 20 or the outer container 22 is taken as the lowermost part, when the aerosol dispenser 20 or the container 22 is vertically oriented in its normal use or storage position. The top and bottom are longitudinally opposed, with the top typically being open at a neck 24 and bottom typically being a closed end. The terms 'above' and 'below' refer to relative positions towards and away from the top, respectively. Likewise the terms 'above' and 'below' refer to relative positions away from and towards the bottom, respectively.

The aerosol dispenser 20 and outer container 22 have a longitudinal axis, defining the main axis. The aerosol dispenser 20 and outer container 22 may be longitudinally elongate, i.e. having an aspect ratio of longitudinal dimension to transverse dimension[s] such as diameter greater than 1, an aspect ratio equal to 1 as in a sphere or shorter cylinder, or an aspect ratio less than 1.

The outer container 22 may comprise metal or preferably plastic, as are known in the art. The plastic may be polymeric, and particularly comprise polyethylene terephthalate (PET) or polypropylene (PP) for all of the components described herein. The outer container 22 may be injection molded or further blow molded in an ISBM process, as well known in the art. The outer container 22 defines a longitudinal axis and may have an opening at one end thereof. The opening is typically at the top of the pressurizeable container when the pressurizeable container is in its-in use position.

As the top of the outer container 22 is approached, the outer container 22 may have a neck 24. The opening defines a neck 24, to which other components may be sealingly joined. The neck 24 may be connected to the container sidewall by a shoulder 23. The shoulder 23 may more particularly be joined to the sidewall by a radius. The shoulder 23 may have an annular flat. The neck 24 may have a greater thickness at the top of the outer container 22 than at lower portions of the neck 24 to provide a differential thickness. Such differential thickness may be accomplished through having an internally stepped neck 24 thickness.

A normally closed valve 28 may be disposed in the neck 24. The valve 28 is openable upon demand by a user, in response to manual operation of an actuator 29. The actuator 29 may be depressable, operable as a trigger, etc. to spray product 42 from the aerosol dispenser 20. Illustrative and non-limiting products 42 include shave cream, shave foam, body sprays, body washes, perfumes, cleansers, air treatments, astringents, foods, paint, insecticides, etc.

The valve 28 or valve cup may be sealed to the neck 24 of the outer container 22 using class 1 TPE material. Polyester based TPE sold by Kraiburg TPE GmbH & Co KG of Waldkraiburg, Germany under the name HTC8791-52 and sold by DuPont of Delaware under the name HYTEL may be used for good resistance to Silicone and adhesion to PET. Such a TPE material is believed to fall under Resin Identification Code 1/01 for PETE/PET, as set forth above by the Society of Plastics Industry and ASTM D7611. Or a Styrenic bloc copolymer based TPE such as Kraiburg HTC8791-24 or Krayton elastomer may be used, providing easier process and lower density. Other seal materials include silicone, rubber and similar conformable materials.

If desired, the valve 28 may be sealed to the outer container 22 utilizing a fitting 25. The fitting may be threaded fitting 25 or a bayonet fitting 55. The fitting 25 may allow for engagement of the valve cup with the neck of the container to occur in either the clockwise direction or the counterclockwise direction.

A valve 28, in turn, may be disposed within the valve cup. The valve 28 provides for retention of product 42 within the aerosol dispenser 20 until the product 42 is selectively dispensed by a user. The valve 28 may be selectively actuated by an actuator 29. A nozzle 27 and related valve 28 components may optionally be included, depending upon the desired dispensing and spray characteristics. The valve 28 may be attached using conventional and known means. The valve 28 and actuator 29 may be conventional and do not form part of the claimed invention, except as provided herein.

The valve 28 and valve cup may be integral and formed by a single injection molding operation. Or the valve 28 and conventional valve cup may be joined using known means. The valve 28 may be a normally closed valve 28. A normally closed valve 28 is closed in its rest position. The valve 28 is only opened when actuated upon demand by a user.

The components of the valve 28 may be joined to a common valve housing 28H. The housing 28H acts as a chassis for the other valve components and joins the valve 28 to the neck 24 of the outer container 22 or preform. A valve stem 28S provides a product 42 flow path and joins the actuator 29 to the valve 28 in fluid communication. The valve stem 28S may be disposed within and cause responsive movement in the moving assembly 28M. The valve stem 28S has a valve stem distal end, taken as the uppermost portion of the valve stem 28S without an actuator 29 or other attachment.

The valve 28 may have blades 28B, to allow for a chuck to rotationally attach the valve 28. The valve 28 may also have an optional sheath 28P to protect valve stem 28S.

The valve 28 may be externally or preferably internally threaded. The threads 25 may or may not circumscribe the neck 24, as desired. One or more threads 25 may be utilized, with four threads 25, each thread 25 subtending about 90 degrees having been found suitable. The valve 28 is assembled by screwing onto the complementary threads 25. The assembly of the valve 28 onto outer container 22 is intended to be permanent.

Selective actuation of the valve 28 allows the user to dispense a desired quantity of the product 42 on demand. Illustrative and non-limiting products 42 include shave cream, shave foam, body sprays, body washes, perfumes, cleansers, air fresheners, astringents, foods, paint, etc.

The product delivery device 55, 56 may be used to contain and/or provide for delivery of product 42 from the aerosol dispenser 20 upon demand. Suitable product delivery devices 55, 56 comprise pistons, bags 55, dip tubes 56 (as shown in phantom), and do not form part of the claimed invention, except as specifically claimed herein. If desired, the product delivery device 55, 56 may further comprise a metering device for dispensing pre-determined, metered quantities of product 42, as described in U.S. Pat. Nos. 2,815,889; 4,142,652 and 5,421,492. The product delivery device 55, 56 may also comprise an inverting valve having a ball therein to alter product 42 flowpath.

If desired the product delivery device 55, 56 may comprise a dip tube 56 disposed in a bag 55. Such a dip tube 56 may reach to nearly the bottom of the bag 55, or be juxtaposed near the middle of the bag 55. A dip tube may be made according to U.S. Pat. No. 8,091,741.

The bag 55 may be directly attached to the valve cup. Particularly, bag 55 may be integrally injection molded with the valve cup. If the preform is to be stretched into a bag 55, the preform may have a wall thickness of 1 to 3 mm. The resulting bag 55 is collapsible upon depletion of product 42 therefrom. The resulting bag 55 may have a thickness of 0.07 to 0.2 mm.

One of skill will recognize the preform may be used to make the outer container 22 or a bag 55 for use with the aerosol container 20 of this invention. One of skill will recognize a bag 55 is commonly used to contain product 42 and keep such product 42 isolated from the propellant 40.

The pressurizeable container may further include a propellant 40. The propellant 40 may comprise hydrocarbons, nitrogen, air and mixtures thereof. Nonflammable propellant 40 listed in the US Federal Register 49 CFR 173.115, Class 2, Division 2.2 are also considered acceptable. The propellant 40 may particularly comprise a Trans-1,3,3,3-tetrafluoroprop-1-ene, and optionally a CAS number 1645-83-6 gas. One such propellant 40 is commercially available from Honeywell International of Morristown, N.J. under the trade name HFO-1234ze or SOLSTICE.

If desired, the propellant 40 may be condensable. Generally, the highest pressure occurs after the aerosol dispenser 20 is charged with product 42 but before the first dispensing of that product 42 by the user. A condensable propellant 40, when condensed, provides the benefit of a flatter depressurization curve at the vapor pressure, as product 42 is depleted during usage. A condensable propellant 40 also provides the benefit that a greater volume of gas may be placed into the container at a given pressure. A condensable propellant 40, such as HFO-1234ze, may be charged to a gage pressure of 100-400 kPa at 21 degrees C.

A manifold may supply propellant 40, under pressure, through at least one channel between the valve cup and container neck 24. The manifold may be retractingly disposed above the container 22. The manifold may be brought into contact with the valve cup, forming a temporary seal therebetween. Suitable channels are particularly described in commonly assigned U.S. Pat. No. 8,869,842 to Smith at FIG. 8, column 7, lines 57 to column 8, line 2 and column 8, lines 44-60. While the temporary seal is established between the manifold and valve cup, the propellant 40 may be charged into the outer container 22.

The aerosol dispenser 20, as presented to a user may have an initial pressure. The initial pressure is the highest pressure encountered for a particular filling operation, and corresponds to no product 42 yet being dispensed from the product delivery device 55, 56. As product 42 is depleted, the outer container 22 approaches a final pressure. The final pressure corresponds to depletion of substantially all product 42, except for small residual, from the product delivery device 55, 56. One benefit of the invention is that the residual product 42, remaining at end of life, is unexpectedly minimized.

This arrangement provides the benefit that propellant 40 may be charged to a lesser pressure than the desired starting pressure, decreasing propellant 40 charge time and reducing pressure applied to the charging machinery. Another benefit is that propellant 40 is disposed as needed for the end use when the aerosol dispenser 20 is ready for sale, product 42 fill and upon product 42 depletion may be recharged with product 42 and reused.

At 21 degrees C., the outer container 22 may be pressurized to an internal gage pressure of 100 to 1300, 110 to 490 or 270 to 420 kPa. A particular aerosol dispenser 20 may have an initial propellant 40 pressure of 1100 kPA and a final propellant 40 pressure of 120 kPa, an initial propellant 40 pressure of 900 kPA and a final propellant 40 pressure of 300 kPa, an initial propellant 40 pressure of 500 kPA and a final propellant 40 pressure of 0 kPa, and any values therebetween.

If desired, the outer container 22, valve cup, valve 28, and/or piston may be polymeric. By polymeric it is meant that the component is formed of a material which is plastic, comprises polymers, and/or particularly polyolefin, polyester or nylons, and more particularly PET. Thus, the entire aerosol dispenser 20 or, specific components thereof, may be free of metal, allowing microwaving. Microwave heating of the aerosol dispenser 20 or pressurizable container therefor provides for heating of the product 42 prior to dispensing. Heating of the product 42 prior to dispensing may be desirable if the product 42 is applied to the skin, becomes more efficacious at lower viscosities, or is to be eaten.

The outer container 22, and all other components, optionally excepting the TPE seal, may comprise, consist essentially of or consist of PET, PEN, Nylon, EVOH or blends thereof to meet DOT SP 14223. All such materials may be selected from a single class of recyclable materials, as set forth above by the Society of Plastics Industry and ASTM D7611. Particularly all components of the aerosol dispenser 20 may comprise the aforementioned TPE and PET/PETE, Resin Identification Code 1/01. This material selection provides the benefit that the entire aerosol dispenser may advantageously be recycled in a single stream.

Alternatively, the valve cup and/or bag 55 may comprise plural layers such as nylon with EVOH, PET and/or polyolefin materials. Three layers may be utilized, such as PET/Nylon/PET or PET/EVOH/PET. The layers may be co-molded or overmolded. The multi-layer arrangements may provide increased barrier resistance and reduced failure rates.

The outer container 22, and/optionally the product delivery device 55, 56, may be transparent or substantially transparent. This arrangement provides the benefit that the consumer knows when product 42 is nearing depletion and allows improved communication of product 42 attributes, such as color, viscosity, etc. Also, labeling or other decoration of the container may be more apparent if the background to which such decoration is applied is clear.

Suitable decoration includes labels 57. Labels 57 may be shrink wrapped, printed, etc., as are known in the art.

The outer container 22 may define a longitudinal axis of the aerosol dispenser 20. The outer container 22 may be axisymmetric as shown, or, may be eccentric. While a round cross-section is shown, the invention is not so limited. The cross-section may be square, elliptical, irregular, etc. Furthermore, the cross section may be generally constant as shown, or may be variable. If a variable cross-section is selected, the outer container 22 may be barrel shaped, hourglass shaped, or monotonically tapered.

The outer container 22 may range from 6 to 60 cm, and particularly 10 to 40 cm in height, taken in the axial direction and from 3 to 60 cm, and particularly 4 to 10 cm in diameter if a round footprint is selected. The outer container 22 may have a volume ranging from 40 to 1000 cc exclusive of any components therein, such as a product delivery device 55, 56. The outer container 22 may be injection stretch blow molded. If so, the injection stretch blow molding process may provide an overall stretch ratio of greater than 8, 8.5, 9, 9.5, 10, 12, 15 or 20 and less than 50, 40 or 30.

The outer container 22 may sit on a base. The base is disposed on the bottom of the outer container 22. Suitable bases include petaloid bases, champagne bases, hemispherical or other convex bases used in conjunction with a base cup. Or the outer container 22 may have a generally flat base with an optional punt.

Referring to FIGS. 3A-6C and examining the invention in more detail, the valve 28 may be held in place by complementary threads 25 disposed on the neck 24 of the outer container and the valve 28. The threads 25 may be disposed directly on the valve 28, as described below.

A cap 80 is provided. The cap 80 is separable from the valve 28 and/or the outer container 22. The cap 80 is generally annular, with a central hole. The central hole accommodates the valve stem 28S therethrough, so that the valve may operate without obstruction.

The cap 80 may have a depending skirt 82. The skirt 82 can provide for engagement with the outer container 22 and/or the valve 28. The skirt 82 may be internally or externally threaded. The skirt 82 may further have splines 84. The splines 84 may be axially parallel or skewed relative to the longitudinal axis.

Referring to FIGS. 3A-3D, internal threads 25 may be disposed in the cap 80, and the valve 28 may be free of threads 25. In this embodiment, the valve 28 may be threadedly held in place by the cap 80.

This arrangement provides the benefit that a single cap 80 may be used with different valves, 28, providing flexibility in manufacture. Particularly, stock valves 28 may be selected, depending upon the desired dispensing characteristics. Caps 80 may be easily injection molded to specifically fit such stock valves 28.

In such embodiment, the valve 28 is seated into position in the neck 24. The cap 80 overlays the valve 28 and threadedly engages the neck 24 to hold the valve 28 in place.

Below the threads 25 in the skirt 82 may be internal or external splines 84. Complementary splines 84 are disposed on the neck of the outer container 22. The splines 84 of the cap 80 and/or the splines 84 of the neck 24 may be internal or external, as desired. Any such arrangement is feasible, so longs as the splines 84 co-act to hold the valve 28 in place.

After rotationally threading the cap 80 into position, the cap 80 is axially compressed onto the neck 24. The splines 84 on the cap 80, and optionally particularly on the skirt 82 thereof, engage the splines 84 on the neck 24 of the outer container 22. This arrangement advantageously prevents the valve 28 from unthreading from the aerosol container 20C. Further, the cap 80 cannot unthread, because the splines 84 do not allow engagement of the threads 25 to allow reverse rotation of the cap.

Figure 3D:
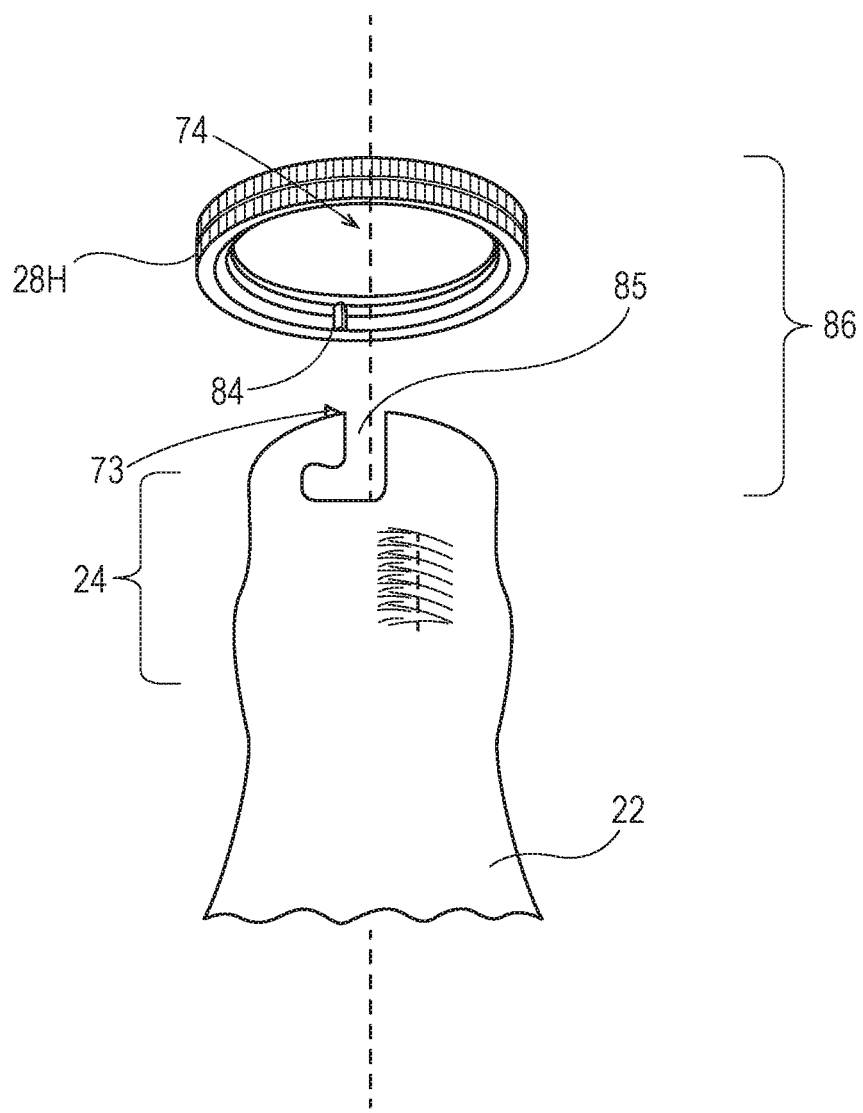
FIG. 3D is a schematic fragmentary exploded perspective view of an outer container and cap having a bayonet fitting, the intermediate valve being omitted for clarity.

Referring particularly to FIG. 3D, the splines 84 need not be elongate, to engage other elongate splines 84, as previously shown. The splines 84 may be of any desired and suitable geometry. For example, one or more splines 84 may have the form of nubs, projections or other suitable profiles. This geometry allows such spline 84 to be used with a bayonet fitting 85. It is to be understood that the bayonet fitting 85 may be disposed on the cap 80 and the spline 84 disposed on the outer container 22 or vice versa.

Such an embodiment allows assembly of the valve 28 into the neck 24 of the outer container 22, as described above. Then the cap 80 is sealingly assembled by inserting the at least one spline 84 into the bayonet fitting 85. The valve 28 is likewise sealed, preventing escape of the product 42 or propellant 40. The cap 80 cannot be removed without unintended destruction or deformation.

Referring to FIGS. 4A-4C, the valve 28 may optionally be threadedly received in the neck 24 of the outer container 22 or may have no threads 25, as shown in FIGS. 3A-3C. This arrangement provides for retention of the valve 28, but does not prevent reverse rotation and rotation of the valve 28.

The cap 80 may have internal or external threads 25. The cap 80 may be threadedly attached to the neck 24 of the outer container 22 above the valve 28. The cap 80 may be smooth and free of blades, to prevent removal of the cap 80, and subsequent disassembly of the valve 28. This arrangement provides the benefit that a common chuck may be used to assemble the cap 80, using known torque control processes.

Referring to FIGS. 5A-5C, the cap 80 and neck 24 may have a complementary ratchet 73 and pawl 74 arrangement. As used herein a pawl 74 is an extending member, generally cantilevered and which can rotate with the valve 28, as it is threaded into place. The pawl 74 may coactingly intercept a complementary ratchet. As used herein a ratchet 73 is a member which intercepts a pawl, allowing the pawl 74 to move in a first direction, but not in a second, opposed direction.

A ratchet, and preferably a plurality of ratchets 73, may be disposed around the periphery of the neck 24. The ratchets 73 may be stationary relative to the neck 24 and not rotate as the valve 28 is dropped into or threaded into place. More preferably, the ratchets 73 circumscribe the neck 24 of the outer container 22.

The ratchets 73 may comprise sprags, cams, and other structural features which allow only unidirectional rotational motion. The sawtooth ratchet 73 has two surfaces, a sloped onward surface and a generally perpendicular stop surface. The ratchet 73 may rise to a crest or to a flat, as desired. The pawls 74 and ratchets 73 may have different geometries, as shown or may have identical geometry. If the onward direction is clockwise, the reverse direction is counterclockwise and vice versa. Both clockwise and counterclockwise rotations are contemplated hereunder.

The cam surfaces allow movement in the onward direction, according to the incline of the sloped onward surfaces. The stop surface is generally perpendicular to the circumferential rotation direction, to impede rotational detachment and reverse movement of the valve 28. By impede it is meant that the valve 28 does not undergo reverse rotation, and possible loosening/disassembly from the neck 24, without undue and unintended torque applied thereto. Preferably the ratchets 73 and pawls 74 completely prevent discernable reverse rotation or subsequent disassembly of the valve 28. Tamper evident bands, which indicate a valve 28 or other component of the aerosol dispenser 20 has been removed are not within the scope of the claimed invention.

Either of the pawls 74 and ratchets 73 may be disposed on the cap 80, providing a complementary ratchet 73 or pawl 74 is disposed on the outer container 22. By complementary, it is meant the ratchets 73 and pawls 74 are sized to fit together, allowing movement in the onward direction, and preventing improper movement in the reverse direction. Also the ratchets 73 and pawls 74 are disposed on a nominally common, and preferably coincident, diameter.

While the disclosure is directed to equal numbers of plural ratchets 73 and pawls 74, equally spaced about the longitudinal axis, the invention is not so limited. Unequal numbers of ratchets 73 and pawls 74, single ratchets 73, single pawls 74, unequally spaced ratchets 73 and/or unequally spaced pawls 74 are contemplated and within the scope of the present invention.

In a first embodiment the pawls 74 and ratchets 73 may predominantly extend in the axial direction and in a degenerate case may be parallel to the longitudinal axis. One of the pawls 74 and ratchets 73 may be disposed on the outer container 22. If desired, the pawl 74 or ratchet 73 disposed on the outer container 22 may be integrally molded with the preform used to make the outer container 22.

The other of the ratchets 73 and pawls 74 may be co-actingly disposed on the cap 80. This geometry provides the benefit of increased engagement between the ratchets 73 and pawls 74 as the cap 80 is further threaded onto the outer container 22. The first embodiment provides the benefit of confining the ratchet 73 and pawl 74 configuration to a more compact footprint and diameter within the aerosol dispenser 20.

In a second embodiment the pawls 74 and ratchets 73 may predominantly extend in the radial direction and in a degenerate case may be perpendicular to the longitudinal axis. Either of the pawls 74 and ratchets 73 may be disposed on the neck 24 and cap 80, as the case may be. The second embodiment provides the benefit that the greater radius provided by radially outwardly extending pawls 74 and ratchets 73 provides proportionally greater torsional resistance to attempted reverse rotation of the cap 80.

A third embodiment may be utilized, which is a hybrid of the first two embodiments. The hybrid embodiment has longitudinally extending ratchets 73 and radially extending pawls 74. The pawls 74 are disposed on the preform and, upon blowmolding, are disposed on the outer container 22. The pawls 74 may extend radially inwardly or radially outwardly, as sized to intercept the ratchets 73. The cap may have ratchets 73 which extend longitudinally downwardly to automatically engage the pawls 74 as the cap 80 is threaded onto the outer container 22.

This arrangement provides the benefit that since the ratchets 73 do not allow for reverse rotation, but do allow for onward movement, no additional tooling is required in manufacture and the permanent attachment of the valve 28 to the aerosol container 20C and ultimately the aerosol dispenser 20, and occurs automatically and without requiring an extra step during manufacture. Again the valve housing 28H may have threads 25 or be free of threads 25 as desired. Thus, either of the pawls 74 or ratchets 73 may be disposed on the outer container 22. Again, the pawl 74 or ratchet 73 disposed on the outer container 22 may be integrally molded with the preform used to make the outer container 22.

Generally, it is to be understood that a single ratchet 73 and single pawl 74 may be suitable for any of the embodiments described herein. Plural ratchets 73 and plural pawls 74 are preferred to provide load sharing when torque in the reverse direction is applied. The ratchets 73 and pawls 74 are preferably equally circumferentially spaced, to further equalize torque about the longitudinal axis. The ratchets 73 may be mutually equally sized and shaped or be mutually unequally sized and shaped. Likewise, the pawls 74 may be mutually equally sized and shaped or be mutually unequally sized and shaped, so long as they co-act with the ratchets 73, as described herein.

Referring to FIGS. 6A-6C, the cap 80 may have spikes 86. The spikes may depend from the top of the cap 80 and/or from the skirt 82. The spikes 84 may taper to a distal end, to allow for insertion into complementary spaces between blades 28B of the valve 28. The cap 80 may further and optionally be held into place with the co-acting splines 84, as discussed above.

In this arrangement, the valve 28 is disposed into the neck 24, with or without threads 25, as desired. The cap 80 is fitted over the valve 28. The depending spikes 86 fit between blades 28B. As the cap 80 is axially compressed onto the valve 28 and neck 24, the effective width of the spikes 86 in the circumferential direction increases. The width of the spikes 86 allow the spikes to frictionally engage adjacent blades 28B.

The frictional engagement of the spikes 86 with the valve 28 prevents removal of the cap 80, and thereby prevents removal of the valve 28.

This arrangement provides the benefit that circumferential pressure applied to the blades 28B of the valve 28 can assist in locking the valve 28 in place and not loosening under vibration and normal handling. Potential thread 25 mismatch is avoided, as such a cap 80 can be disposed in the desired place under only axial displacement.

The invention may be made according to any of the following nonlimiting paragraphs, in any combination.

A. An aerosol container having a longitudinal axis and being usable for an aerosol dispenser, said aerosol container comprising:

an outer container having a closed end bottom, an open threaded neck longitudinally opposed thereto, said open neck having a periphery;

a complementary valve disposed onto said neck, said valve having a housing, a moving assembly disposed in said housing, said moving assembly having a valve stem therein for dispensing product therethrough; and a cap overlying said valve and having an opening for receiving said valve stem therethrough, said cap and said outer container each having a plurality of co-acting splines wherein said splines prevent reverse rotation of said valve from said container neck.

B. An aerosol container according to paragraph A wherein said splines disposed on said neck of said outer container are parallel to said longitudinal axis.

C. An aerosol container according to paragraphs A and B wherein said splines disposed on said neck of said outer container are parallel to said longitudinal axis and said splines on said cap are parallel to said longitudinal axis.

D. An aerosol container according to paragraphs A, B and C wherein at least one of said cap and said valve further comprises a plurality of spikes for engaging the other.

E. An aerosol container according to paragraphs A, B, C and D wherein one of said cap and said valve further comprises a plurality of spikes for engaging the other and the other of said valve and said cap further comprises a plurality of slots for receivably engaging said spikes when said valve is disposed said outer container.

F. An aerosol container according to paragraphs A, B, C, D and E wherein said cap further comprises a plurality of downwardly extending spikes for engaging said valve, said spikes circumscribing said valve stem.

G. An aerosol container according to paragraphs A, B, C, D, E and F wherein said cap further comprises a plurality of downwardly extending spikes for engaging said valve, said spikes circumscribing said valve stem, said valve further comprising a plurality of blades radially connecting said moving assembly to said housing, said spikes being disposed intermediate said blades.

H. An aerosol container according to paragraphs A, B, C, D, E, F and G wherein said cap further comprises a plurality of downwardly extending cantilevered spikes for engaging said valve, said spikes tapering from a proximal end to a distal end downwardly oriented and remote therefrom.

I. An aerosol container having a longitudinal axis and being usable for an aerosol dispenser, said aerosol container comprising:

an outer container having a closed end bottom, an open threaded neck longitudinally opposed thereto, said open neck having a periphery;

a complementary valve disposed onto said neck, said valve having a housing, a moving assembly disposed in said housing, said moving assembly having a valve stem therein for dispensing product therethrough; and a cap overlying said valve and having an opening for receiving said valve stem therethrough, said cap being threadably received by said outer container to prevent reverse rotation of said valve from said container neck.

J. An aerosol container according to paragraph I wherein said cap is internally threaded into said container neck.

K. An aerosol container according to paragraphs I and J wherein said container neck has a top, and said cap is internally threaded into said container neck and wholly disposed below said top of said neck.

L. An aerosol container according to paragraph I wherein said cap is externally threaded into said container neck.

M. An aerosol container according to paragraphs I and L wherein said cap is externally threaded into said container neck, said cap having a depending skirt.

N. An aerosol container according to paragraphs I, L and M wherein said cap is externally threaded into said container neck, said cap having a depending skirt, said depending skirt having at least one pawl or ratchet thereon, said at least one pawl or ratchet coacting with a complementary pawl or ratchet disposed on said outer container to prevent reverse rotation of said valve.

O. An aerosol container having a longitudinal axis and being usable for an aerosol dispenser, said aerosol container comprising:

an outer container having a closed end bottom, an open neck longitudinally opposed thereto for receiving a complementary valve therein, said open neck having a periphery;

a complementary valve received in said neck, said valve having a housing, a moving assembly disposed in said housing, said moving assembly having a valve stem therein for dispensing product therethrough; and a cap overlying said valve and having an opening for receiving said valve stem therethrough, said cap and said outer container having at least one of splines, threads and a bayonet fitting which engage said outer container to prevent removal of said valve from said container neck.

P. An aerosol container according to paragraph O wherein said cap has a depending skirt, said skirt having said splines for engaging said neck of said outer container.

Q. An aerosol container according to paragraphs O and P wherein said cap has a depending skirt, said skirt having said splines therein for engaging said neck of said outer container, said container neck having coacting splines for engaging said splines of said skirt.

R. An aerosol container according to paragraphs O, P and Q wherein said cap has a depending skirt, said skirt having an internal thread therein and splines below said thread, for engaging said neck of said outer container, said container neck having a coacting thread and splines therebelow for engaging said threads and said splines of said skirt.

S. An aerosol container according to paragraphs O, P and Q, one of said cap and said outer container having a spline, the other of said outer container and said cap having a complementary bayonet fitting for receiving said spline therein.

T. An aerosol container according to paragraphs O, P, Q, R and S said cap further comprising a plurality of longitudinally oriented spikes for engaging said valve to prevent reverse rotation thereof.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" and a pressure disclosed as "about 1100 kPa" is intended to include 1103.2 kPa.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern. All limits shown herein as defining a range may be used with any other limit defining a range. That is the upper limit of one range may be used with the lower limit of another range, and vice versa.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An aerosol container having a longitudinal axis and being usable for an aerosol dispenser, said aerosol container comprising:
    an outer container having a closed end bottom and an open neck longitudinally opposed thereto for receiving a complementary valve therein, said open neck having a periphery, said complimentary valve having a housing with a moving assembly disposed in said housing, said moving assembly having a valve stem therein for dispensing product therethrough, wherein said complementary valve is disposed within said open neck such that said complementary valve engages an interior of said open neck of said outer container, and wherein said housing of said complimentary valve does not extend above said open neck;
    a seal between said complimentary valve and interior of said outer container, said seal disposed below said complimentary valve; and
    a cap overlying said complimentary valve and having an opening for receiving said valve stem therethrough, said cap and said outer container each having at least one of splines, threads, or a bayonet fitting which engage said outer container to prevent removal of said valve from said neck.

2. The aerosol container according to claim 1, wherein said cap has a depending skirt, said skirt having said splines for engaging said neck of said outer container.

3. The aerosol container according to claim 1, wherein said cap has a depending skirt, said skirt having said splines for engaging said neck of said outer container, said neck having co-acting splines for engaging said splines of said skirt.

4. The aerosol container according to claim 1, wherein said cap has a depending skirt, said skirt having an internal thread therein and internal splines below said internal thread, said thread and said splines for engaging said neck of said outer container, said neck having a co-acting thread and splines therebelow for engaging said thread and said splines of said skirt.

5. The aerosol container according to claim 1, wherein said complimentary valve comprises a valve cup and wherein said seal is disposed below said valve cup.

* * * * *